(12) United States Patent
Cariou et al.

(10) Patent No.: US 11,296,830 B2
(45) Date of Patent: Apr. 5, 2022

(54) ENHANCED HYBRID AUTOMATIC REPEAT REQUEST FOR WIRELESS COMMUNICATIONS

(71) Applicant: Intel Corporation, Santa Clara, CA (US)

(72) Inventors: Laurent Cariou, Portland, OR (US); Xiaogang Chen, Portland, OR (US); Po-Kai Huang, San Jose, CA (US); Feng Jiang, Santa Clara, CA (US); Thomas J. Kenney, Portland, OR (US); Qinghua Li, San Ramon, CA (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 16/784,024

(22) Filed: Feb. 6, 2020

(65) Prior Publication Data

US 2020/0177319 A1 Jun. 4, 2020

Related U.S. Application Data

(60) Provisional application No. 62/803,007, filed on Feb. 8, 2019, provisional application No. 62/801,808, filed on Feb. 6, 2019.

(51) Int. Cl.
*H04W 84/12* (2009.01)
*H04L 1/18* (2006.01)
*H04L 1/00* (2006.01)
*H04W 80/02* (2009.01)

(52) U.S. Cl.
CPC .......... *H04L 1/1819* (2013.01); *H04L 1/0008* (2013.01); *H04W 80/02* (2013.01); *H04W 84/12* (2013.01)

(58) Field of Classification Search
CPC ..... H04L 1/1819; H04L 1/0008; H04W 80/02
See application file for complete search history.

(56) References Cited

U.S. PATENT DOCUMENTS

| | | | |
|---|---|---|---|
| 2015/0063111 A1* | 3/2015 | Merlin | H04B 7/0452 370/235 |
| 2017/0245306 A1* | 8/2017 | Kim | H04L 69/324 |
| 2018/0070344 A1* | 3/2018 | Lim | H04L 27/26 |
| 2019/0246312 A1* | 8/2019 | Kim | H04W 52/365 |
| 2020/0052832 A1* | 2/2020 | Tian | H04L 1/1845 |

(Continued)

*Primary Examiner* — Fahmida S Chowdhury
(74) *Attorney, Agent, or Firm* — Eversheds Sutherland (US) LLP

(57) ABSTRACT

This disclosure describes systems, methods, and devices related to an enhanced hybrid automatic repeat request (HARQ). A device may determine two or more HARQ medium access control (MAC) frames. The device may determine a difference between a first number of bits of a physical layer (PHY) codeword and a second number of bits of a first HARQ MAC frame of the two or more HARQ MAC frames. The device may generate, based on the difference, a third number of bits, wherein the first number of bits is equal to a sum of the second number of bits and the third number of bits. The device may generate an aggregated MAC frame comprising the first HARQ MAC frame, the third number of bits, and a second HARQ MAC frame of the two or more HARQ MAC frames. The device may send the aggregated MAC frame.

20 Claims, 18 Drawing Sheets

(56) References Cited

U.S. PATENT DOCUMENTS

2020/0107325 A1\* 4/2020 Zhang ............... H04L 25/03866
2020/0136764 A1\* 4/2020 Zhang .................. H04L 1/0083
2020/0235863 A1\* 7/2020 Sugaya ................ H04L 1/0061

\* cited by examiner

ENHANCED HYBRID AUTOMATIC REPEAT REQUEST FOR WIRELESS COMMUNICATIONS

CROSS-REFERENCE TO RELATED APPLICATIONS

This application claims the benefit of U.S. Provisional Application No. 62/801,808, filed Feb. 6, 2019, and of U.S. Provisional Application No. 62/803,007, filed Feb. 8, 2019, the disclosures of which are incorporated herein by reference as if set forth in full.

TECHNICAL FIELD

This disclosure generally relates to systems and methods for wireless communications and, more particularly, to a hybrid automatic repeat request (HARQ).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
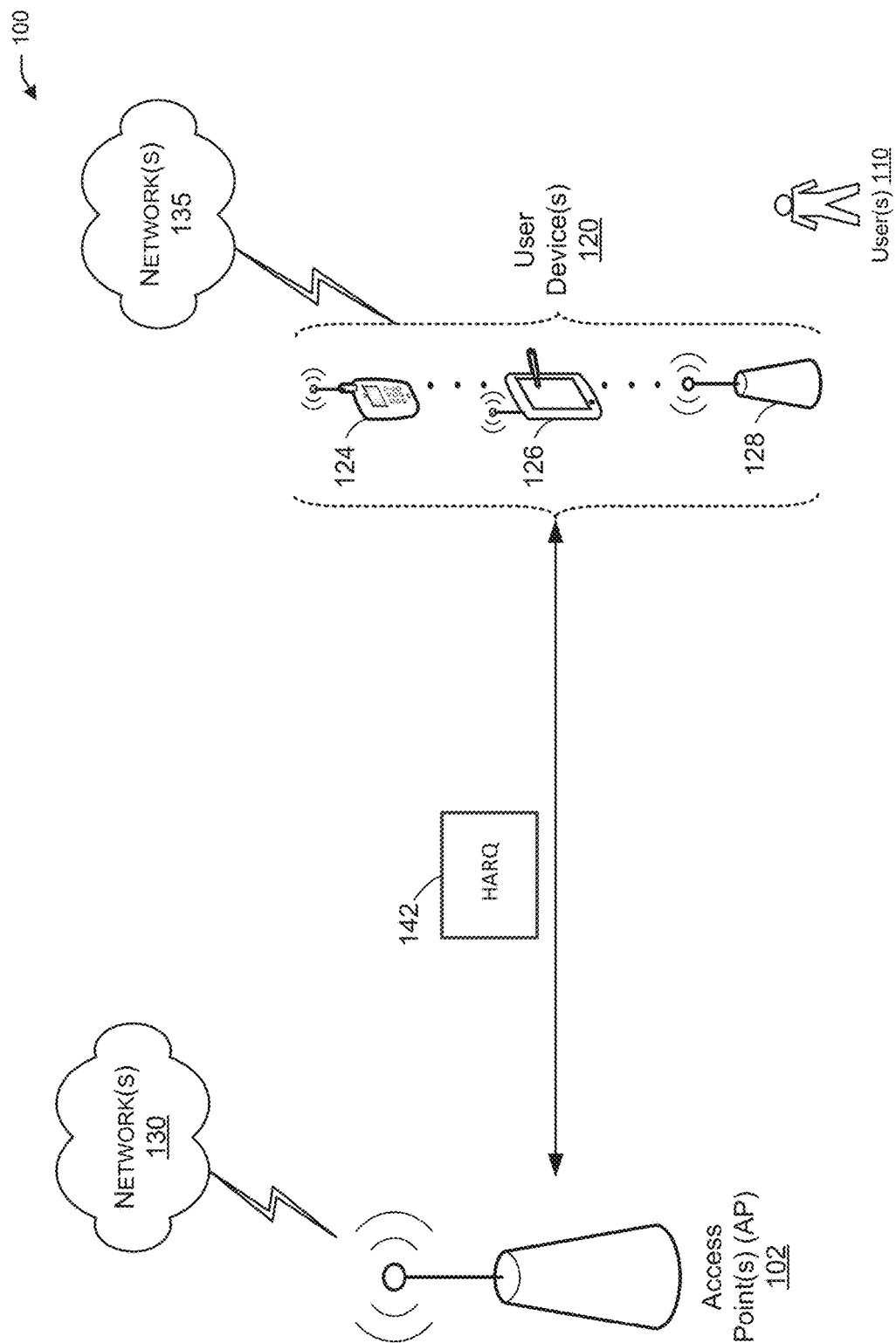
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The use of hybrid automatic repeat request (HARQ) is a strong candidate technology for extreme high throughput (EHT) in wireless communications (e.g., for IEEE 802.11 communications). HARQ may increase the complexity and the redesign of the complete physical layer (PHY) and medium access control (MAC) layer of the open systems interconnection (OSI) model, and of the functional separation between the PHY and MAC layers.

HARQ relies on the concept that the recipient of a transmission may detect and store a failed portion of the transmission, and may indicate to the initiator (e.g., the device that sent the failed transmission) that a portion was not received and processed correctly, allowing the initiator to retransmit the failed portion. The recipient may combine the stored portion with the corresponding retransmitted portion, allowing for improved detection.

HARQ is a PHY-based mechanism (e.g., occurring at the PHY layer, where channel coding/decoding is done and where HARQ combining may occur), while a current ARQ retransmission concept is a MAC-based mechanism, which relies on MAC protocol data units (MPDUs) that may be aggregated in aggregated MPDUs (A-MPDUs), and for which the recipient of the A-MPDUs may indicate to the originator whether a successful or unsuccessful reception occurred.

There is therefore currently no alignment between the low-density parity-check (LDPC) codeword used in the PHY domain and the MPDUs used in the MAC domain.

A portion of the transmission may be stored and retransmitted with HARQ and may be designed based on MPDUs or based on LDPC codewords.

HARQ packets may include a preamble, so when a packet is retransmitted using HARQ, its preamble that may have been included in the failed transmission may be included again in the retransmission. In low signal-to-noise (SNR) regions of transmission, this may result in a bottle neck. Therefore, enhancements to the HARQ packet preamble may improve communications.

HARQ may be used in medium or low SNR regions (e.g., when an SNR is below a threshold value). This may be because higher modulation and coding schemes (MCS) used in HARQ may use more memory to store the temporary information used for HARQ combining, and because in high SNR regions (e.g., SNRs exceeding a threshold), improved link adaptation may be applied so that HARQ may not result in as much gain as HARQ may result in when used in lower SNR regions.

Communications may benefit from an enhanced HARQ packet, a HARQ incremental redundancy scheme for LDPC to minimize the impact of implementation changes, and from new HARQ capabilities to limit implementation overhead.

Example embodiments of the present disclosure relate to systems, methods, and devices for enhanced HARQ.

In one or more embodiments, a MPDU based HARQ system may facilitate an MPDU-based chase combining HARQ mechanism that works as follows:

1) The A-MPDU is constructed so that the start of each HARQ MPDU within the A-MPDU are aligned with the start of a codeword (CW) or CW block.

2) If the end of the HARQ MPDU is not aligned with the end of a codeword block, the transmitter includes either:

a) Padding bits if the number of remaining bits is below a threshold number of bits.

b) A non-HARQ MPDU or non-HARQ MPDU fragment if the number of remaining bits is greater than a threshold number of bits.

c) Some control information if the number of remaining bits is greater than a threshold number of bits.

3) The recipient may store HARQ MPDUs that are not correctly received to combine them with retransmissions, and may not store non-HARQ MPDUs or non-HARQ MPDUs fragments (e.g., because they may not be aligned with a CW).

In one or more embodiments, a MPDU based HARQ system may modify the A-MPDU subframe structure in order to enable the transmitter to inform the recipient of the content of the A-MPDU subframe.

The A-MPDU subframe header may include fields that enable a device to identify whether padding is included at the end of the A-MSDU subframe and until the end of the CW-block.

The A-MPDU subframe header may include fields that enable a device to identify whether control information is included, and which information, at the end of the A-MSDU subframe and until the end of the CW-block.

Optionally, the A-MPDU subframe header may include a field indicating whether the MPDU that is included in the A-MPDU subframe is an HARQ MPDU or a non-HARQ MPDU.

In one or more embodiments, a MPDU based HARQ system may be applied to any aggregation mechanism defined in the MAC: A-MPDU, A-MSDU, new aggregation.

In one or more embodiments, HARQ packets may use an extended range (ER) preamble as defined in the IEEE 802.11ax communications standard.

In one or more embodiments, HARQ packets may use a power increase for some fields of a packet to reduce overhead.

In one or more embodiments, HARQ packets may enable earlier bandwidth indications (e.g., before a signature-A field of a packet).

In one or more embodiments, HARQ packets may use incremental redundancy to provide improved gain in comparison to using chase combining.

In one or more embodiments, HARQ may support 20 MHz/40 MHz/80 MHz, etc. transmissions. HARQ may support MCS 2, MCS 7, and other MCS schemes. HARQ may be limited to a number of retransmissions supported by a receiver of a device using HARQ. A HARQ transmit capability and a HARQ receiver capability may be defined. By limiting HARQ parameters, HARQ may account for the high storage cost needed to store intermediate information on a device.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, according to some example embodiments of the present disclosure. Wireless network environment 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
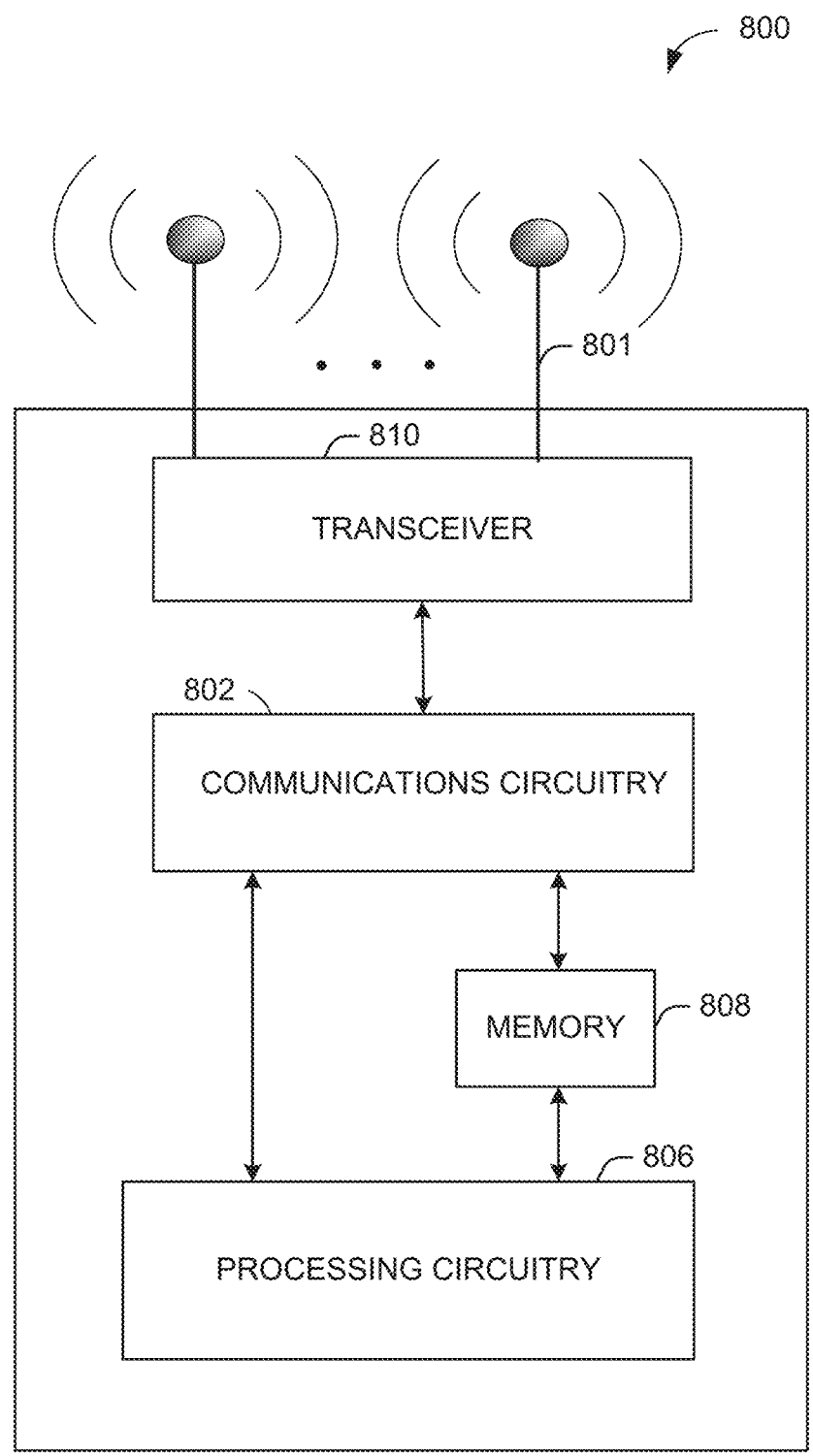
FIG. 8 illustrates a functional diagram of an exemplary communication station that may be suitable for use as a user device, in accordance with one or more example embodiments of the present disclosure.
Figure 9:
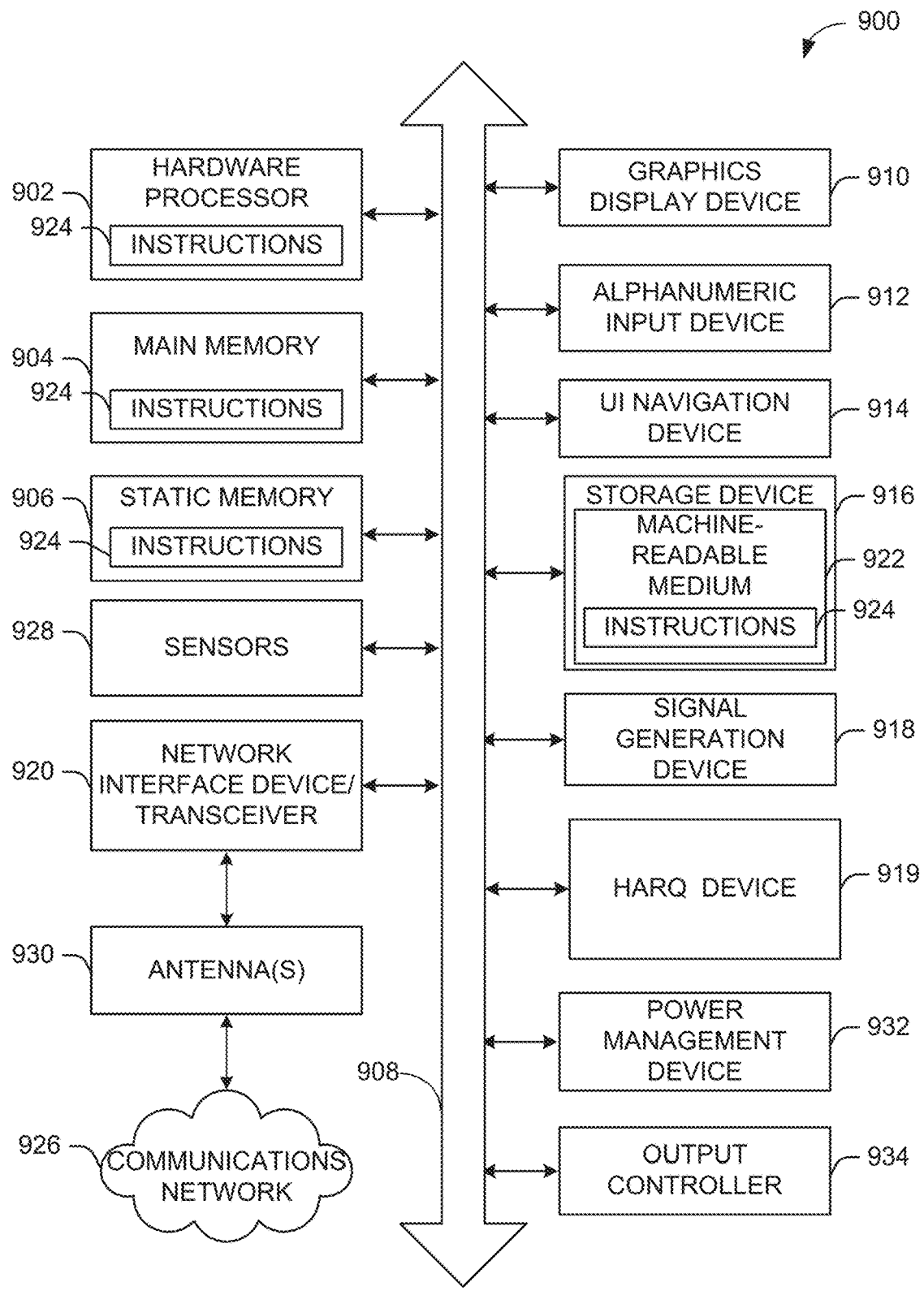
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate HARQ 142 with one or more user devices 120 by sending packets using enhanced HARQ as described further herein.

It is understood that the above descriptions are for purposes of illustration and are not meant to be limiting.

Figure 2A:
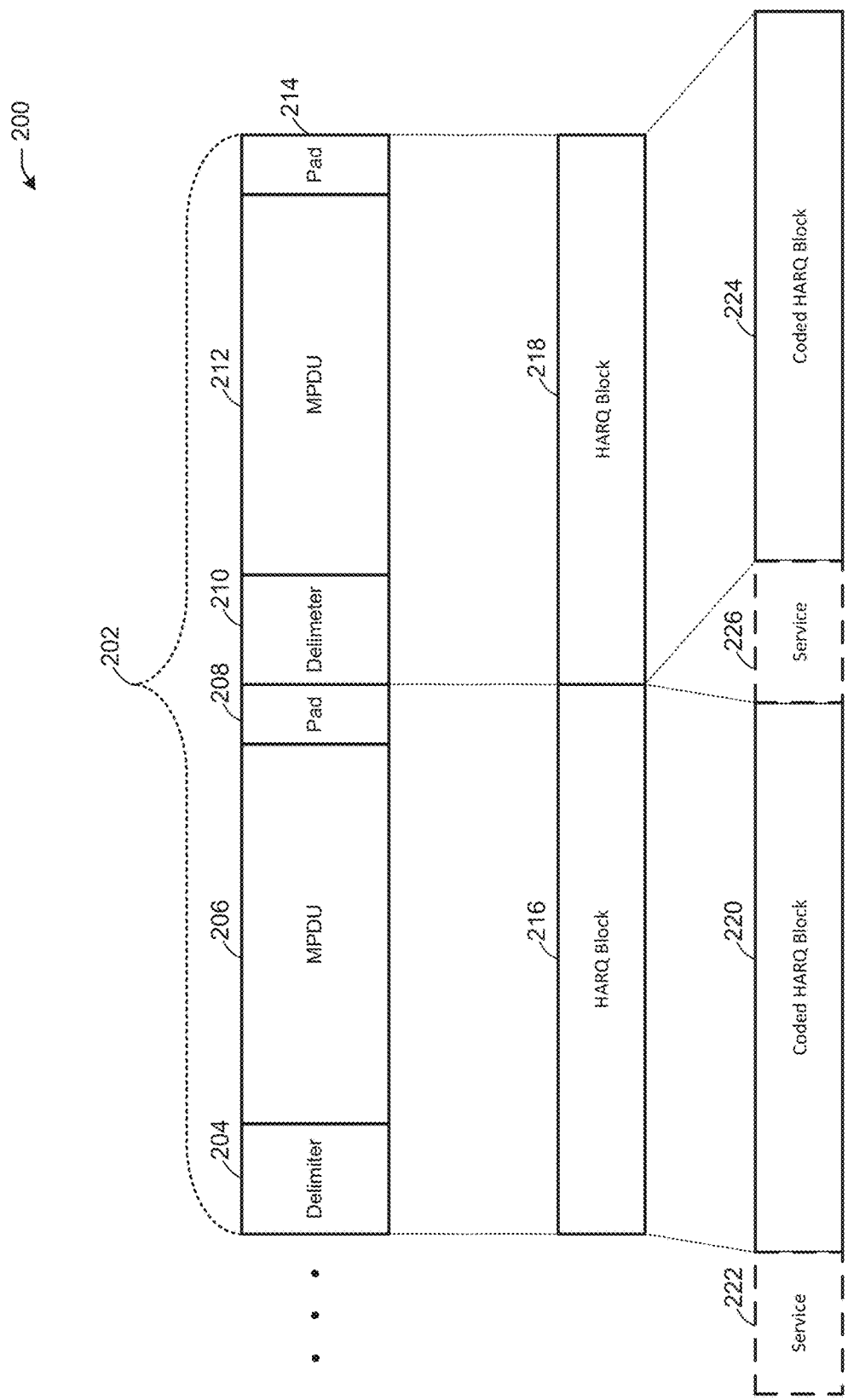
FIG. 2A depicts an illustrative alignment of an aggregated medium access control (MAC) layer protocol data unit (A-MPDU) and a hybrid automatic repeat request (HARQ) block, in accordance with one or more example embodiments of the present disclosure.

FIG. 2A depicts an illustrative alignment 200 of an aggregated medium access control (MAC) layer protocol data unit (A-MPDU) and a hybrid automatic repeat request (HARQ) block, in accordance with one or more example embodiments of the present disclosure.

Referring to FIG. 2A, an A-MPDU 202 may include aggregated MPDUs (e.g., a first MDPU delimiter 204, a first MPDU 206, and a first pad 208, a second MPDU delimiter 210, a second MPDU 212, and a second pad 214, etc.). The first MPDU delimiter 204 and the first MPDU 206 combined may be shorter (e.g., in terms of bits) than a first HARQ block 216, so the first pad 208 may be added to the first MPDU delimiter 204 and the first MPDU 206 to make up the difference between the number of bits of the first MPDU delimiter 204 and the first MPDU 206 and the number of bits of the first HARQ block 216. The second MPDU delimiter 210 and the second MPDU 212 combined may be shorter (e.g., in terms of bits) than a second HARQ block 218, so the second pad 214 may be added to the second MPDU delimiter 210 and the second MPDU 212 to make up the difference between the number of bits of the second MPDU delimiter 210 and the second MPDU 212 and the number of bits of the second HARQ block 218.

Still referring to FIG. 2A, the first HARQ block 216 may include a first coded HARQ block 220 preceded by an optional first HARQ block service 222. The second HARQ block 218 may include a second coded HARQ block 224 preceded by an optional second HARQ block service 226. In this manner, the addition of padding may allow for alignment of a respective MPDU and/or respective MPDU delimiter in the A-MPDU 202 with the start of a codeword represented by a coded HARQ block. Such alignment allows for aggregated MAC layer frames to align with PHY codewords represented by HARQ codeword blocks as shown.

In one or more embodiments, the first pad 208 and/or the second pad 214 may be used when the respective number of bits in the respective pad is below a threshold number of bits. For example, when the first pad 208 and/or the second pad 214 would need a number of bits that exceeds a threshold number of bits in order to facilitate the alignment with a HARQ block, the use of the first pad 208 and/or the second pad 214 may be inefficient. However, when the respective number of bits of an MPDU or MPDU and MPDU delimiter is within a threshold number of bits of a HARQ block, the first pad 208 and/or the second pad 214 may be added to the respective MDPU or MDPU with MPDU delimiter of the A-MPDU 202. As an example, the first MPDU 206 may use 1500 bytes while the first coded HARQ block 220 may use 1296 bits for a codeword, so the padding overhead may be 10.8%, thereby reducing the gains provided by HARQ.

Figure 2B:
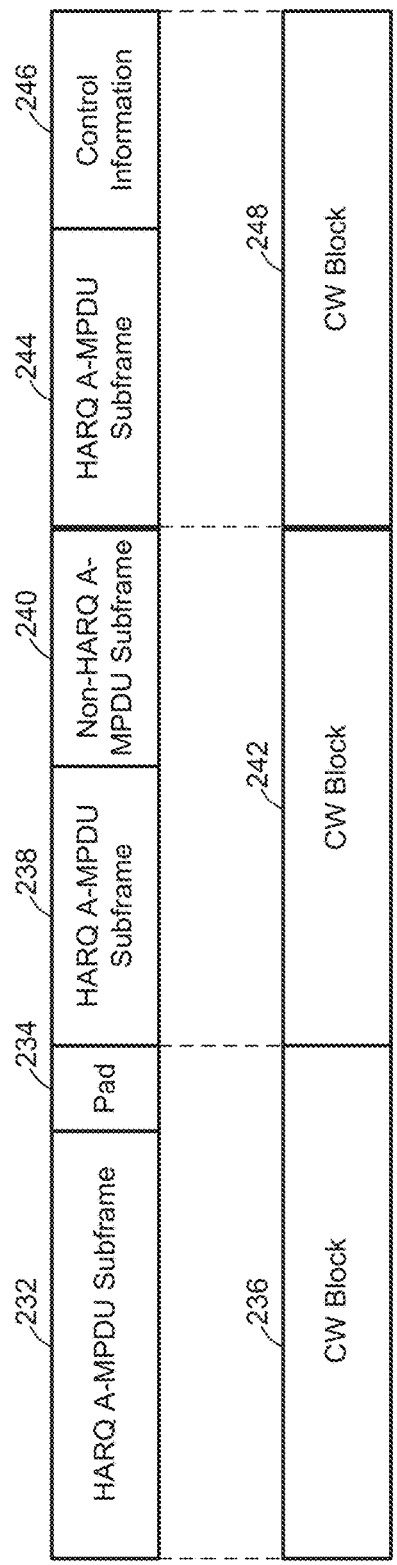
FIG. 2B depicts an illustrative alignment of A-MPDU subframes and codeword blocks, in accordance with one or more example embodiments of the present disclosure.

FIG. 2B depicts an illustrative alignment 230 of A-MPDU subframes and codeword blocks, in accordance with one or more example embodiments of the present disclosure.

Referring to FIG. 2B, a first HARQ A-MPDU subframe 232 may use a pad 234 to align with a first CW block 236. A second HARQ A-MPDU subframe 238 may use a non-HARQ A-MPDU subframe 240 to align with a second CW block 242. A third HARQ A-MPDU subframe 244 may use control information 246 to align with a third CW block 248. For example, the difference in the number of bits used by the first HARQ A-MPDU subframe 232 and by the first CW block may be less than a threshold number of bits, so the pad 234 may be added to the first HARQ A-MPDU subframe 232 to align with the first CW block 236. The difference in the number of bits used by the second HARQ A-MPDU subframe 238 and the second CW block 242 may be greater than a threshold number of bits, so the non-HARQ A-MPDU subframe 240 may be added to the second HARQ A-MPDU subframe 238 to align with the second CW block 242. The difference in the number of bits used by the third HARQ A-MPDU subframe 244 and the third CW block 248 may be greater than a threshold number of bits, so the control information 246 may be added to the third HARQ A-MPDU subframe 244 to align with the third CW block 248.

Because MPDU subframes are MAC layer frames whose length in HARQ retransmissions may not be the same as the length of CW blocks used at the PHY layer for HARQ, the addition of the pad 234, the non-HARQ A-MPDU subframe 240, or the control information 246 to a respective MDPU may align the beginning and ending of MPDU subframes with PHY layer CWs. Such alignment may allow for a HARQ retransmission of MPDUs to correspond to one or multiple LDPC codewords at the PHY layer, thereby allowing the combination of MPDUs for HARQ while preserving functional separation between the MAC and PHY layers in a device.

In one or more embodiments, the concept of a MPDU-based HARQ as illustrated in FIG. 2B may have the advantage of simplicity and of preserving a current functional separation between PHY and MAC layers in devices. The MPDU-based HARQ may require, however, a forced alignment between a MPDU and one or multiple LDPC codewords. The alignment may be necessary so that the MPDU that is retransmitted (e.g., after a failed transmission) corresponds to one or multiple entire LDPC codewords (and is the same as the original transmission that failed), so that the MPDU may be combined (e.g., using coded bits).

In one or more embodiments, an existing A-MPDU subframe structure may be modified to enable a device transmitter to inform a recipient device of the content included in the A-MDPU subframe. For example, a header of an A-MPDU (e.g., the first HARQ A-MPDU subframe 232) may include one or more fields that include one or more identifiers that indicate whether padding (e.g., the pad 234) is included at the end of the A-MPDU until the end (e.g., in bits) of a CW block (e.g., the first CW block 236). A header of an A-MPDU (e.g., the third HARQ A-MPDU subframe 244) may include one or more fields that include one or more identifiers that indicate whether control information (e.g., the control information 246) is included at the end of the A-MPDU until the end (e.g., in bits) of a CW block (e.g., the third CW block 248). A header of an A-MPDU (e.g., the second HARQ A-MPDU subframe 238) may include one or more fields that include one or more identifiers that indicate whether a HARQ MPDU or a non-HARQ MPDU (e.g., the non-HARQ A-MPDU subframe 240) is included at the end of the A-MPDU until the end (e.g., in bits) of a CW block (e.g., the second CW block 242).

In one or more embodiments, other MAC layer frames may be used, such as MAC service data units (MDSUs) and A-MDSUs.

Figure 2C:
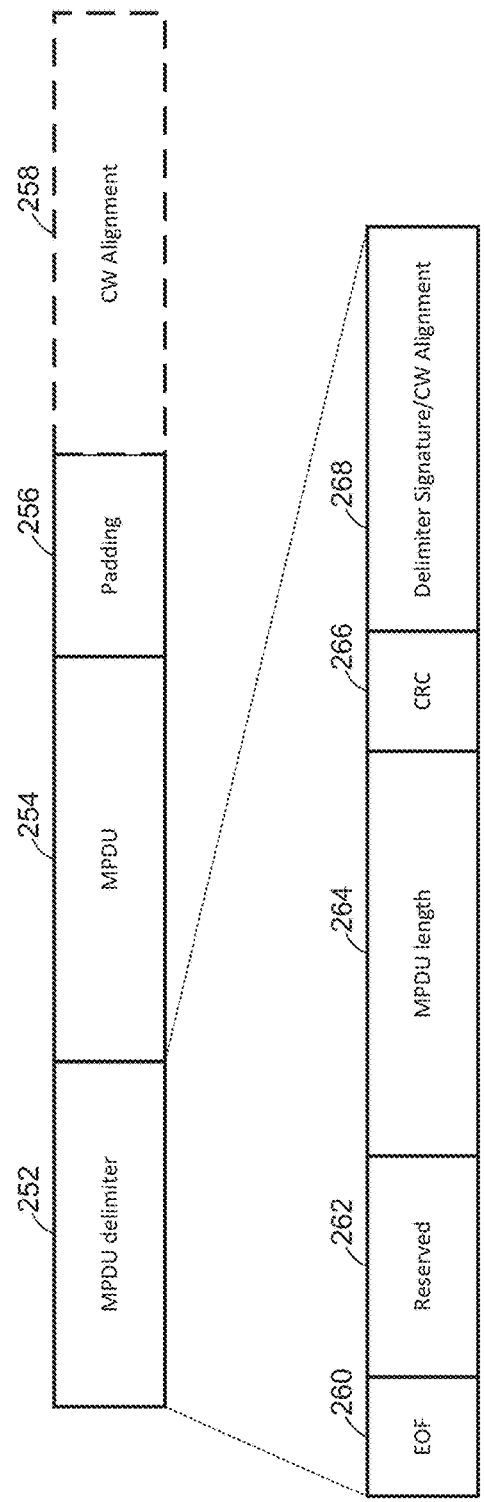
FIG. 2C depicts an illustrative A-MPDU subframe, in accordance with one or more example embodiments of the present disclosure.

FIG. 2C depicts an illustrative A-MPDU subframe 250, in accordance with one or more example embodiments of the present disclosure.

Referring to FIG. 2C, the-MPDU subframe 250 may include a MDPU delimiter field 252, a MPDU 254, padding 256, and an optional CW alignment field 258. The MPDU delimiter field 252 may include an end of frame (EOF) field 260, reserved bits 262, an MPDU length field 264, a cyclic redundancy check field 266, and a delimiter signature/CW alignment field 268. The MDPU delimiter field 252 may have an indication of whether the CW alignment field 258 is present. The length of the CW alignment field 258 may not need to be indicated elsewhere because the length of the CW alignment field 258 may be based on the number of bits needed to render the length of the A-MPDU subframe 250 the same as the length of a CW (a number known by the receiving device). However, the length of the CW alignment field 258 may be indicated by the MPDU delimiter field 252 or elsewhere (e.g., to avoid interactions at the receiving device between MAC and PHY layers).

In one or more embodiments, the delimiter signature/CW alignment field 268 may be expanded from including a single value to including multiple values. One of the multiple values may indicate that the delimiter signature/CW alignment field 268 is present and filled with padding bits until a next CW block boundary, and the receiving device may ignore the field. Other additional values for the delimiter signature/CW alignment field 268 may indicate that the delimiter signature/CW alignment field 268 is present and corresponds to multiple short feedback information types. For example, the delimiter signature/CW alignment field 268 may identify multiple feedback information types, and when a delimiter signature is set to a particular value, the delimiter signature/CW alignment field 268 may be encoded for a given feedback type. The different types and fields may be included in one or more control fields of a MAC header, for example. Alternatively, there may be a single value in the delimiter signature/CW alignment field 268 that indicates that the delimiter signature/CW alignment field 268 is encoded as feedback, and that the delimiter signature/CW alignment field 268 includes a feedback type field (e.g., using one byte or multiple bits), followed by a feedback information field. The feedback type may indicate the type of feedback, and depending on the feedback type, the feedback information field may be encoded with different fields that correspond to the type.

Figure 2D:
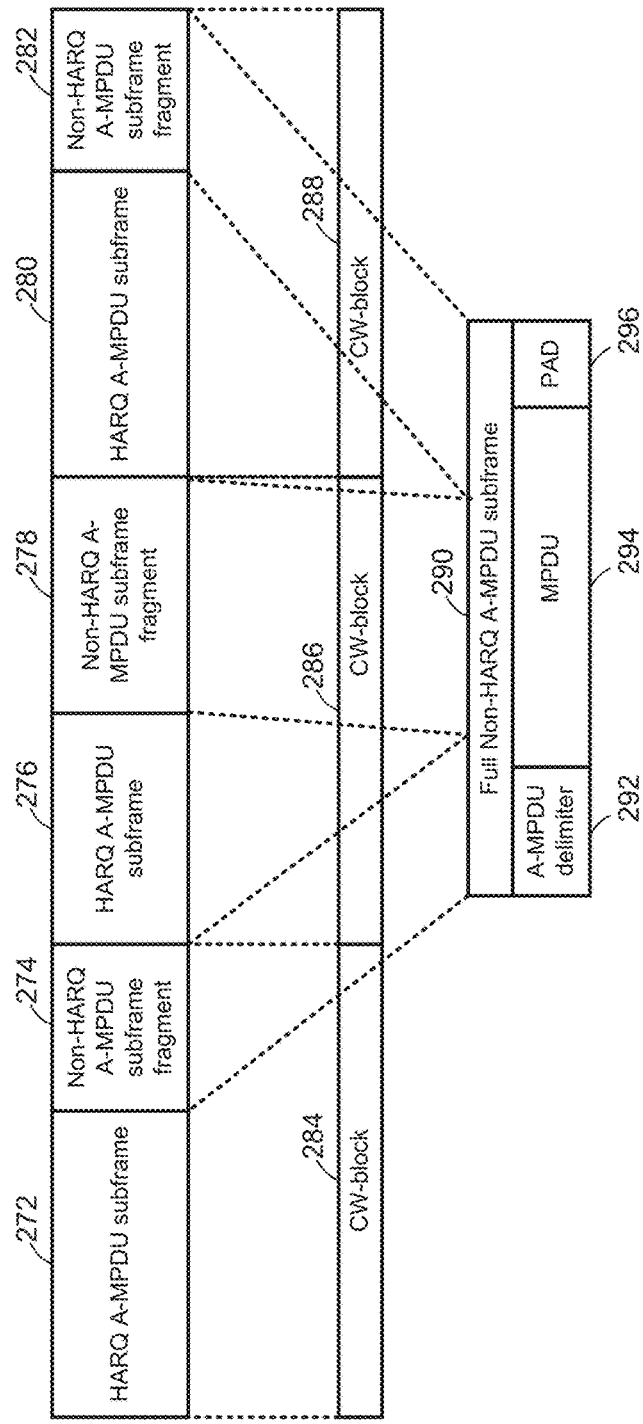
FIG. 2D depicts an illustrative alignment of A-MPDU subframes and codeword blocks, in accordance with one or more example embodiments of the present disclosure.

FIG. 2D depicts an illustrative alignment 270 of A-MPDU subframes and codeword blocks, in accordance with one or more example embodiments of the present disclosure.

Referring to FIG. 2D, a first HARQ A-MDPU subframe 272 may be combined with a first non-HARQ A-MPDU subframe fragment 274. A second HARQ A-MDPU subframe 276 may be combined with a second non-HARQ A-MPDU subframe fragment 278. A third HARQ A-MDPU subframe 280 may be combined with a third non-HARQ A-MPDU subframe fragment 282. The length of the first HARQ A-MDPU subframe 272 combined with the first non-HARQ A-MPDU subframe fragment 274 may be the same as the length of a first CW block 284. The length of the second HARQ A-MDPU subframe 276 combined with the second non-HARQ A-MPDU subframe fragment 278 may be the length of a second CW block 286. The length of the third HARQ A-MDPU subframe 280 combined with the third non-HARQ A-MPDU subframe fragment 282 may be the same as the length of a third CW block 288.

Still referring to FIG. 2D, the first non-HARQ A-MPDU subframe fragment 274, the second non-HARQ A-MPDU subframe fragment 278, and the third non-HARQ A-MPDU subframe fragment 282 may combine to form a full non-HARQ A-MPDU subframe 290. The full non-HARQ A-MPDU subframe 290 may include an A-MPDU delimiter 292, a MPDU 294, and a pad 296.

In one or more embodiments, when a difference between the number of bits of the CW blocks (e.g., the combined number of bits of the first CW block 284, the second CW block 286, the third CW block 288, and any other CW blocks) and the number of bits of the HARQ A-MPDU subframes combined and used in retransmissions (e.g., the first HARQ A-MPDU subframe 272, the second HARQ A-MPDU subframe 276, the third HARQ A-MPDU subframe 280, and any other HARQ A-MPDU subframes) exceeds a threshold number of bits, the non-HARQ MPDUs may be encapsulated into a regular A-MPDU subframe (e.g., the full non-HARQ A-MPDU subframe 290). The overhead may be 4 bytes for the A-MPDU delimiter 292, a MAC header of the MPDU 294, and the pad 296. The non-HARQ MPDU used for combination with the HARQ A-MPDU subframes may be a complete MPDU or fragmented MPDUs (e.g., as shown in FIG. 2D). When fragmented as shown in FIG. 2D, the first non-HARQ A-MPDU subframe fragment 274, the second non-HARQ A-MPDU subframe fragment 278, and the third non-HARQ A-MPDU subframe fragment 282 may be transmitted as a same A-MPDU (e.g., the full non-HARQ A-MPDU subframe 290) using, for example level-3 fragmentation. The fragments may be acknowledged separately by the receiving device.

In one or more embodiments, to reduce overhead, but at the potential cost of not being able to acknowledge separate fragments, the full non-HARQ A-MPDU subframe 290 may include the A-MPDU delimiter 292 and the MPDU 294 fragmented into X fragments distributed at the end of X CW blocks (e.g., three CW blocks as shown) in one or more CW alignment fields (e.g., the delimiter signature/CW alignment field 268 of FIG. 2C). In this case, the first HARQ A-MPDU subframe 272 may include a delimiter signature value indicating that the CW alignment field may include a first fragment of the fragmented non-HARQ A-MPDU subframe (e.g., the full non-HARQ A-MPDU subframe 290). The second HARQ A-MPDU subframe 276 may include a delimiter signature value indicating that the CW alignment field may include a first fragment of the fragmented non- HARQ A-MPDU subframe (e.g., the full non-HARQ A-MPDU subframe 290). The third HARQ A-MPDU subframe 280 may include a delimiter signature value indicating that the CW alignment field may include a first fragment of the fragmented non-HARQ A-MPDU subframe (e.g., the full non-HARQ A-MPDU subframe 290). A single delimiter signature value may be used, as the length of the full non-HARQ A-MPDU subframe 290 may be included in the A-MPDU delimiter 292 of the first fragment. Therefore, a receiving device may not need to know whether a fragment is a first, last, or other fragment of multiple fragments as long as the fragments are transmitted in order (although not necessarily in consecutive CW blocks, as padding or signaling feedback may be included), as the receiving device may reassemble the fragments without the fragment number information. In this manner, when one fragment is lost, the entire MPDU may be lost.

Figure 3:
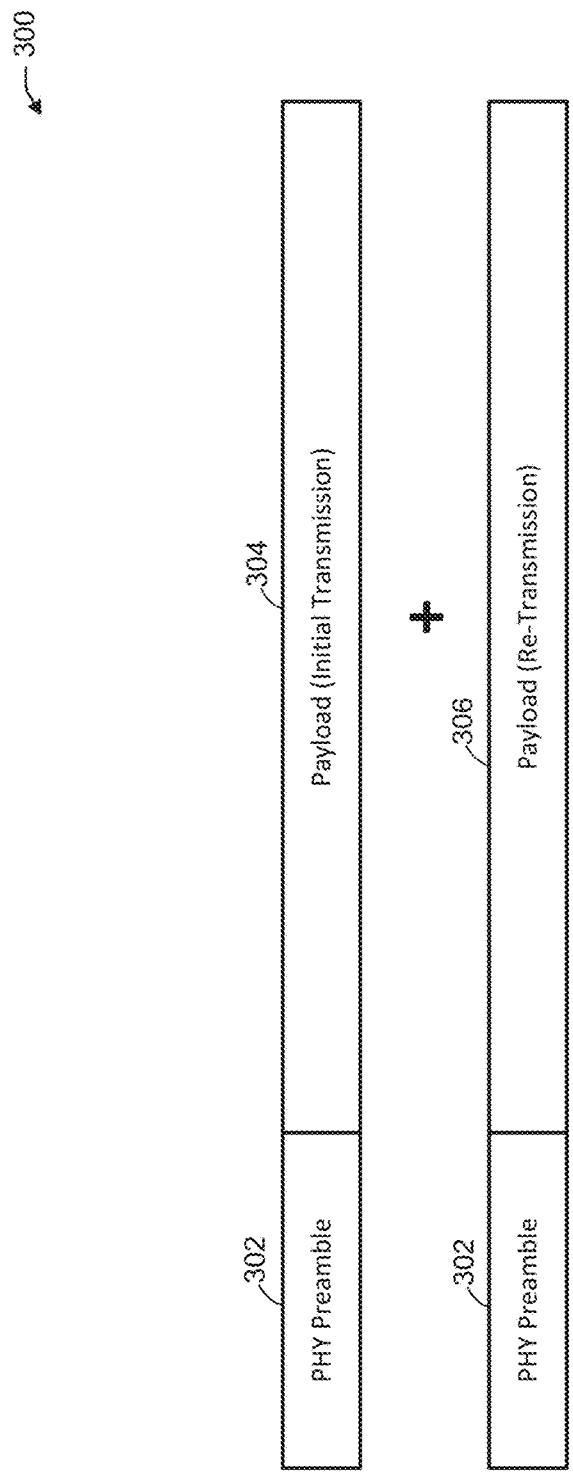
FIG. 3 depicts an illustrative HARQ retransmission format, in accordance with one or more example embodiments of the present disclosure.

FIG. 3 depicts an illustrative HARQ retransmission format 300, in accordance with one or more example embodiments of the present disclosure.

Referring to FIG. 3, a HARQ process may process a PHY preamble 302 and a payload 304 (e.g., for an initial transmission). Upon retransmission (e.g., responsive to at least a portion of the payload 304 failing to be received properly by a device), a HARQ process may retransmit the PHY preamble 302 along with a payload 306 (e.g., which may include at least some of the payload 304). HARQ may provide either combining gain when using a chase combining method or an efficiency gain when incremental redundancy is used. However, the PHY preamble 302 is not supposed to be combined with the payload 306 in the retransmission. Inclusion of the PHY preamble 302 may result in a bottleneck when HARQ is used in a low SNR region (e.g., between 0-5 dB).

In one or more embodiments, HARQ may work in a medium to low SNR region because a higher MCS used may require more memory to store temporary information used for HARQ combining, and because in higher SNR regions with better link adaptation, HARQ may not provide as much gain as HARQ may provide in lower SNR regions.

Figure 4A:
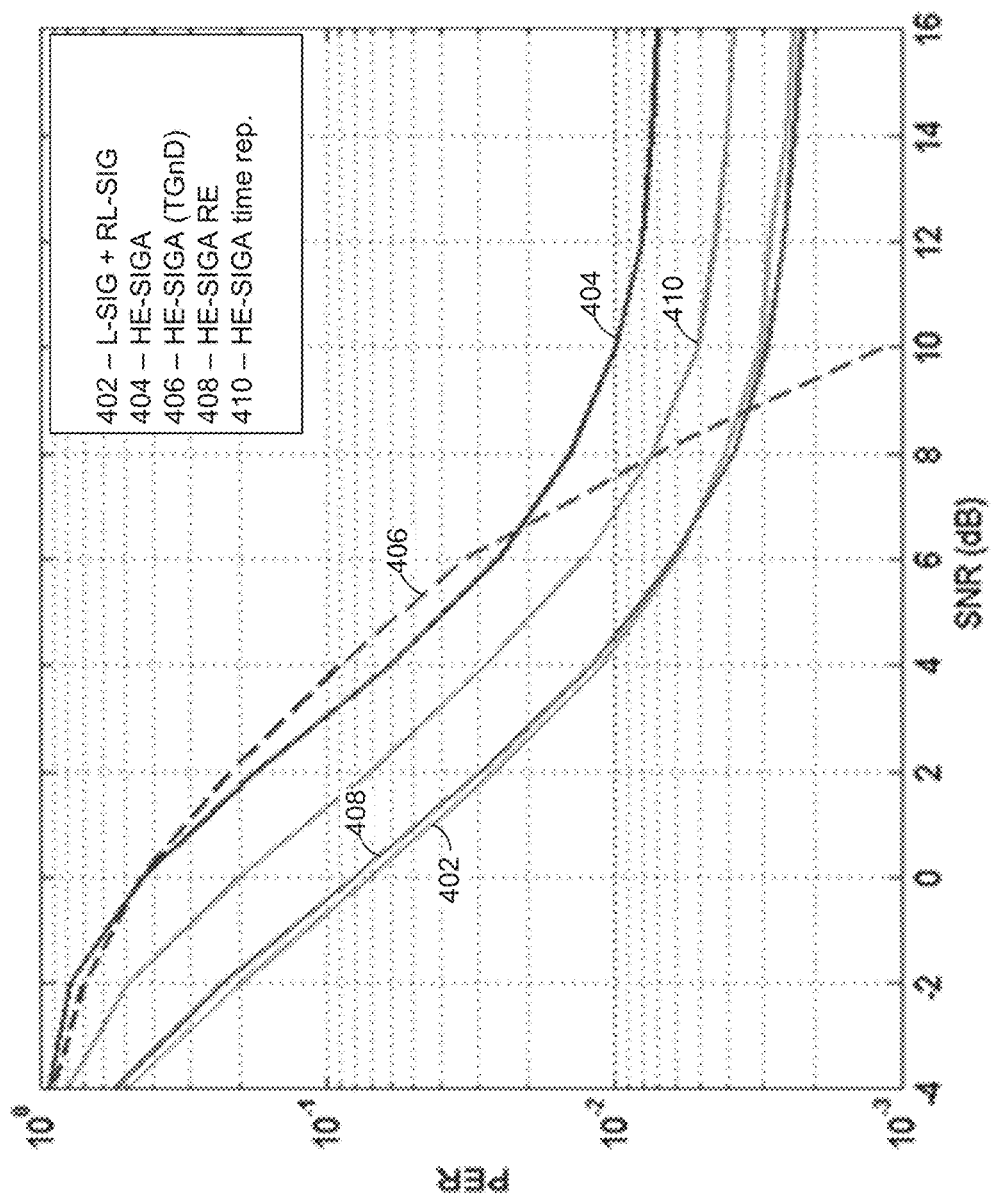
FIG. 4A depicts a graph illustrating performance of a physical layer (PHY) preamble used in HARQ retransmissions, in accordance with one or more example embodiments of the present disclosure.

FIG. 4A depicts a graph 400 illustrating performance of PHY preamble used in HARQ retransmissions, in accordance with one or more example embodiments of the present disclosure.

Referring to FIG. 4A, the graph 400 shows curves for the packet error rate (PER) versus the SNR of fields of a packet used in transmission. The PER for a legacy signature field (L-SIG) and a repeat RL-SIG (RL-SIG) field is represented by the curve 402. The PER for a high efficiency (HE) signature A field (HE-SIGA) is represented by the curve 404. The PER for a HE-SIGA field for transmit ground (TGnD) is represented by the curve 406. The PER for a HE-SIGA RE repeated field is represented by the curve 408. The PER for a HE-SIGA time repeated field is represented by the curve 410.

In one or more embodiments, using an extended range preamble as described above (e.g., curve 408), both the L-SIG field and the HE-SIGA field may achieve low PER from 0 dB to 5 dB. Using an extended range preamble for a HARQ packet may mean that 1) the L-STF field and the L-LTF field are boosted in transmission power (e.g., by 3 dB), 2) the L-SIG field and the RL-SIG field may be combined with one another in a decoding process, and 3) the HE-SIGA field is repeated in the time domain and interleaved in different ways in the repeated copy to achieve diversity gain.

In one or more embodiments, an extended range PPDU may be used only for a single user transmission with 10 MHz or 20 MHz bandwidth. To enable an extended range PPDU for use as a HARQ packet may mean that the extended range preamble may be used for both the extended range PPDU and a regular PPDU carrying a HARQ packet. In this case, a mechanism for distinguishing an extended range PPDU from a regular PPDU carrying a HARQ packet may be needed. The differentiation between packets may be achieved in different ways, such as modifying a reserved bit of an HE-SIGA field in an EHT packet, and/or by providing an indication preceding the SIGA field, such as by modifying L-SIG field content.

In one or more embodiments, an error ratio of a legacy signature field (L-SIG) of a frame or a signature-A field (SIG-A) of a frame may be significantly lower than 10% low SNR regions to allow for HARQ gain using the payload portion of a retransmission, but such may not be the case with a high efficiency (HE) SIG-A field of a frame. Therefore, the preamble of a retransmission may be enhanced using several options.

In one or more embodiments, an option for enhancing the preamble of a retransmission may be to always use an extended range preamble as defined in the IEEE 802.11ax technical standard, for example, for HARQ packets. Another option for enhancing the preamble of a retransmission may be to boost the power of the legacy short training field (L-STF), the legacy long training field (L-LTF), legacy signature field (L-LTF), the repeat legacy signature field (RL-SIG), and/or the signature A field (SIGA) included in a packet by some power increase (e.g., 3 dB or another number). Boosting power reduces overhead due to the use of an extended range preamble as described above. A third option for enhancing the preamble of a retransmission may be to enable an earlier bandwidth indication (e.g., indicate the bandwidth before the SIGA field of a packet) such that frequency domain repetition of an EHT-SIGA field of a packet may be leveraged to achieve frequency diversity gain and combination gain. The earlier indication may be before an EHT-SIGA field of a packet (e.g., in a preceding field). The preamble enhancement options may be applied to a preamble of a HARQ feedback packet as well. A HARQ feedback packet may refer to a packet used to indicate to a transmitting device which portion of the initial transmission from the HARQ transmitter device was improperly decoded (e.g., failed), allowing the HARQ transmitter device to retransmit only the failed portion of the initial transmission rather than the entire PHY protocol data unit (PPDU) that was initially transmitted. Because of error propagation, a HARQ feedback packet may need additional reliability, so a preamble of a HARQ feedback packet may be enhanced using one or more of the options described above.

Figure 4B:
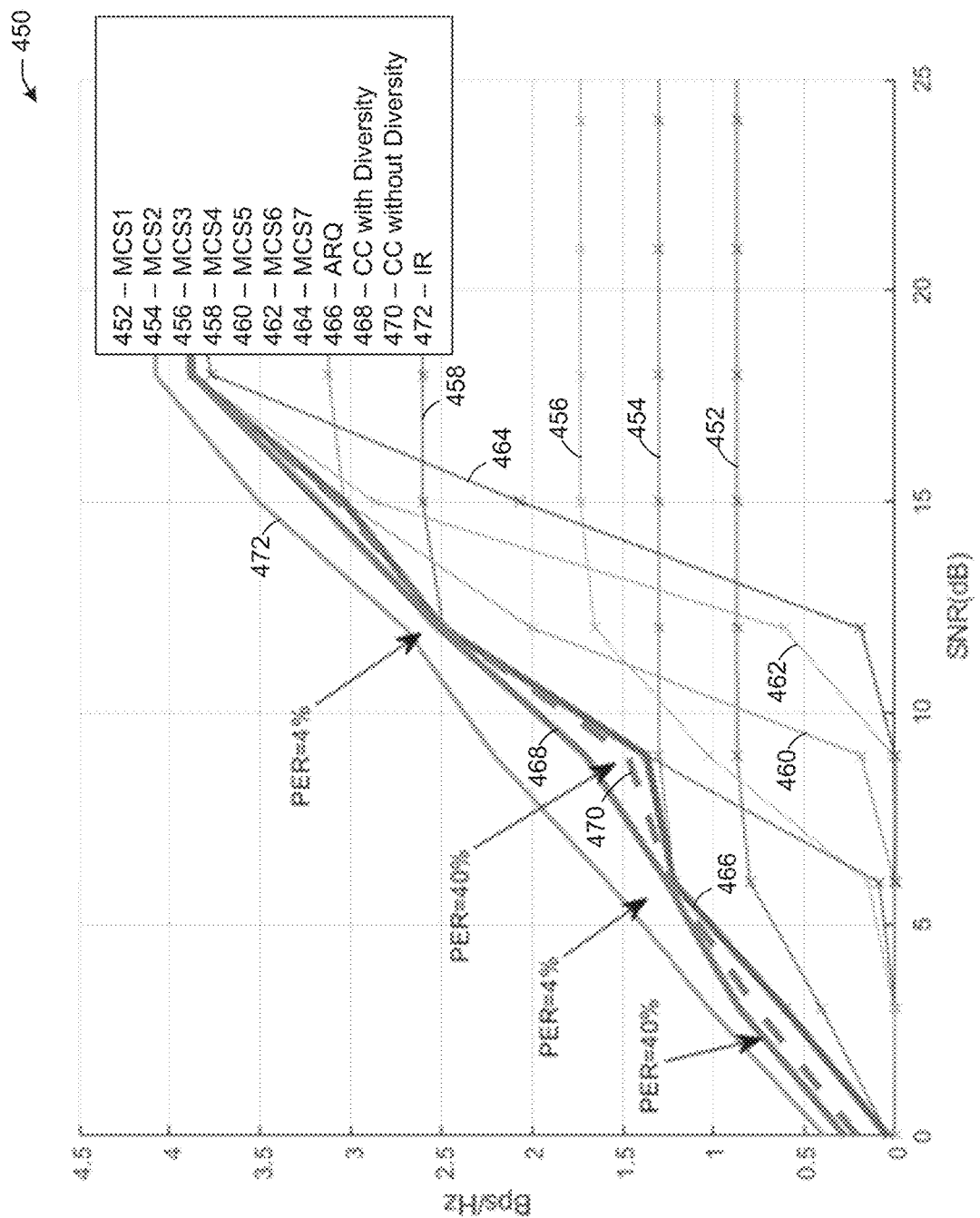
FIG. 4B depicts a graph illustrating performance of a PHY preamble used in HARQ retransmissions, in accordance with one or more example embodiments of the present disclosure.

FIG. 4B depicts a graph 450 illustrating performance of a PHY preamble used in HARQ retransmissions, in accordance with one or more example embodiments of the present disclosure.

Referring to FIG. 4B, the graph shows the gain (Bps/Hz) for a given SNR of different MCS and combining schemes. Curve 452 is for MCS1. Curve 454 is for MCS2. Curve 456 is for MCS3. Curve 458 is for MCS4. Curve 460 is for MCS5. Curve 462 is for MCS 6. Curve 464 is for MCS7. Curve 466 is for automatic repeat request (ARQ). Curve 468 is for chase combining with diversity. Curve 470 is for chase combining without diversity.

In one or more embodiments, the curve 472 for IR indicates that IR provides more gain compared to chase combining (e.g., curve 468 and curve 470). A current LDPC codeword defined by the IEEE 802.11n standard, for example, may not enable incremental redundancy, which punctures an encoded CW in an initial transmission. Defining new LDPC coding parameters may enable incremental redundancy. To simplify changes to the IEEE 802.11 technical standard, the encoding procedure of FIG. 5 may be implemented.

Figure 5:
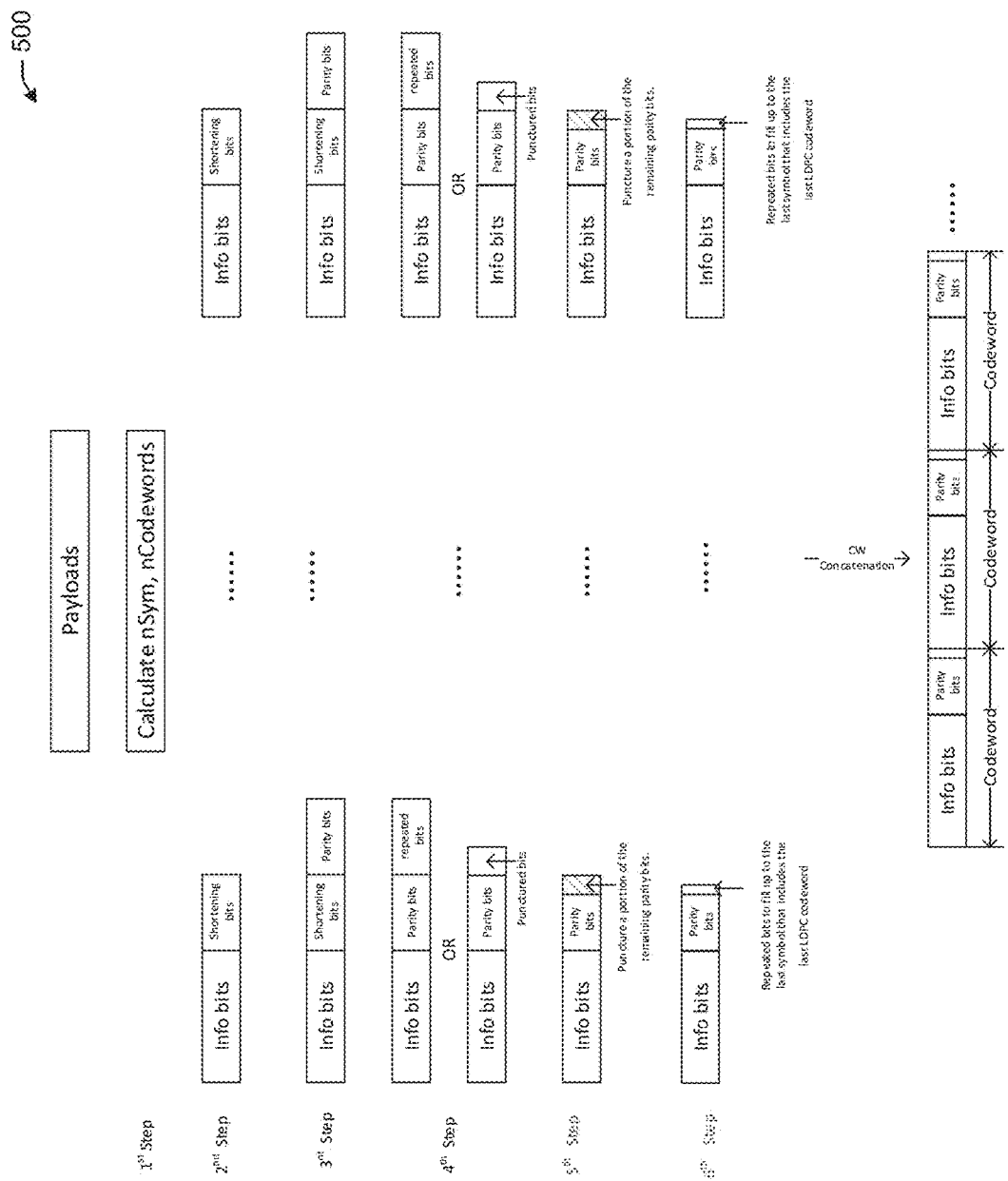
FIG. 5 depicts an illustrative encoding procedure, in accordance with one or more example embodiments of the present disclosure.

FIG. 5 depicts an illustrative encoding procedure 500, in accordance with one or more example embodiments of the present disclosure.

The encoding procedure 500 may enable IR. A current LDPC encoding of the IEEE 802.11 technical standard includes four steps. The encoding procedure 500 may add the fifth and sixth steps shown. In particular, in the initial transmission of HARQ, the encoding procedure 500 may puncture a portion of whatever parity bits remain after step 4 (e.g., puncturing may be conducted in step four, so the additional puncturing may be second level puncturing). The punctured bits may be transmitted in the HARQ retransmission (if there is a retransmission). The percentage of parity bits punctured may depend on the number of HARQ retransmissions used. For example, when only one retransmission is applied, 50% of the parity bits may be punctured in the initial transmission. After step five, there may be some spare symbols due to the punctured bits (e.g., for MCS 1, there may be about 4.5 spare symbols). The encoding procedure 500 may discard the spare symbols and fill the half symbol with repeated information bits or parity bits (step 6). This part of the encoding procedure 500 may is shown in further detail in FIG. 6. The aforementioned procedures are proved to provide additional gain as shown in FIG. 4B (e.g., curve 472).

Figure 6:
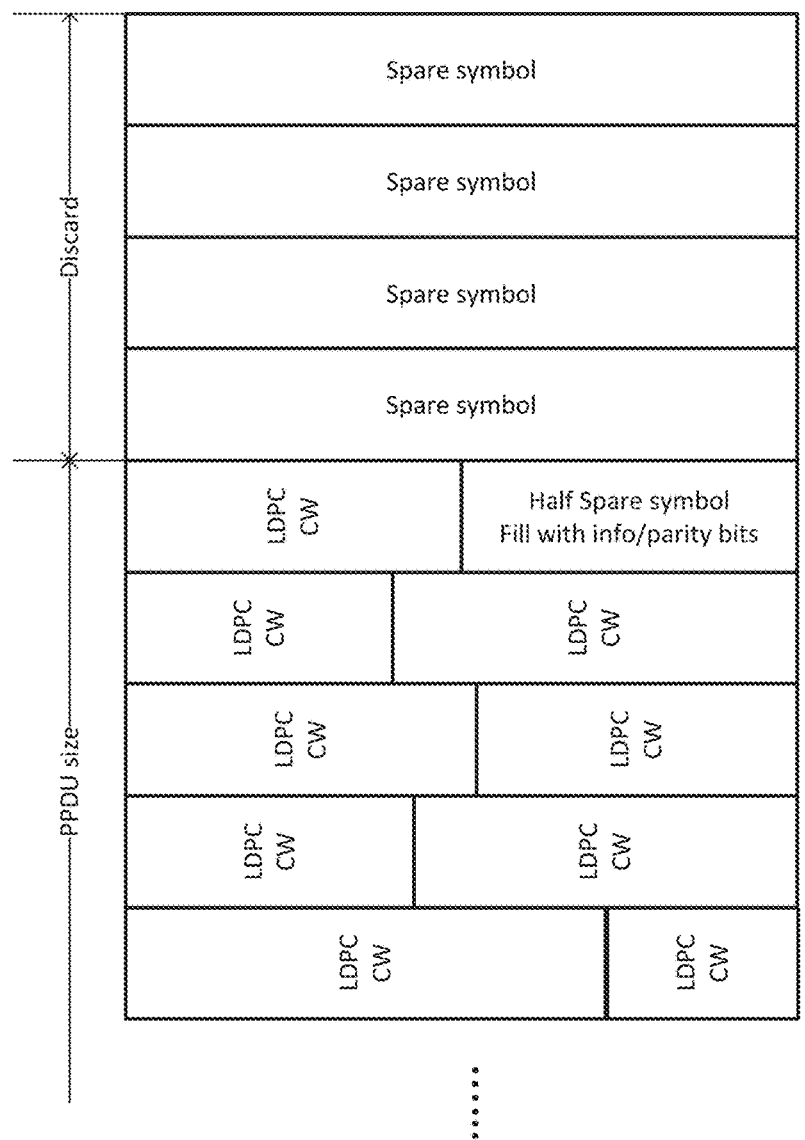
FIG. 6 depicts an illustrative example of a portion of the encoding procedure of FIG. 5, in accordance with one or more example embodiments of the present disclosure.

FIG. 6 depicts an illustrative example of a portion 600 of the encoding procedure 500 of FIG. 5, in accordance with one or more example embodiments of the present disclosure.

Referring to FIG. 6, after step five of the encoding procedure 500, there may be some spare symbols due to the punctured bits (e.g., for MCS 1, there may be about 4.5 spare symbols). The encoding procedure 500 may discard the four spare symbols and fill the half spare symbol with repeated information bits or parity bits (step 6 of the encoding procedure 500.

Figure 7A:
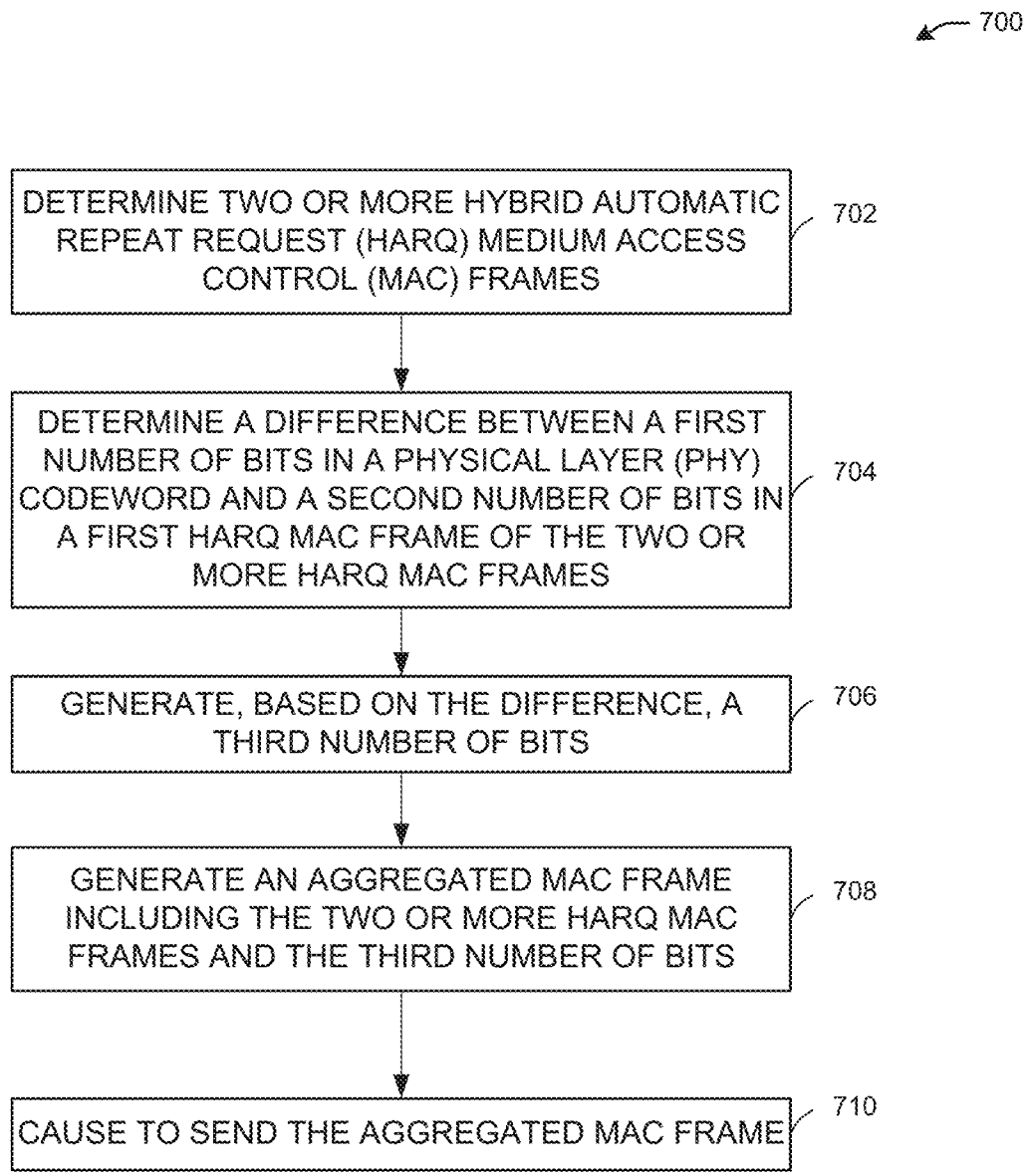
FIG. 7A illustrates a flow diagram of illustrative process for an illustrative MPDU based HARQ system, in accordance with one or more example embodiments of the present disclosure.

FIG. 7A illustrates a flow diagram of illustrative process 700 for an illustrative MPDU based HARQ system, in accordance with one or more example embodiments of the present disclosure.

At block 702, a device (e.g., the user device(s) 120 and/or the AP 102 of FIG. 1) may determine two or more HARQ MAC frames to be sent in a HARQ retransmission (e.g., the first MPDU 206 of FIG. 2A, the second MPDU 212 of FIG. 2A, the first HARQ A-MPDU subframe 232 of FIG. 2B, the second HARQ A-MPDU subframe 238 of FIG. 2B, the third HARQ A-MPDU subframe 244 of FIG. 2B, the first HARQ A-MPDU subframe 272 of FIG. 2D, the second HARQ A-MPDU subframe 276 of FIG. 2D, the third HARQ A-MPDU subframe 280 of FIG. 2D). The two or more HARQ MAC frames may be sent in an A-MPDU using HARQ retransmission.

At block 704, the device may determine to align one or more subframes of the frame with a start of a codeword. For example, the device may determine a difference between the number of bits in a PHY codeword and the number of bits in a respective HARQ MAC frame of the two or more HARQ MAC frames. The number of bits in a HARQ MAC frame may be less than the number of bits in a PHY codeword, so to align a HARQ MAC frame with a PHY codeword (e.g., to make their respective lengths equal), the device may add bits to the HARQ MAC frame based on the difference (e.g., the number of bits needed to add to the HARQ MAC frame to result in the number of bits of the PHY codeword).

At block 706, the device may generate, based on the difference, a third number of bits. The third number of bits may be the difference between the number of bits in the HARQ MAC frame and the number of bits in the PHY codeword. In this manner, the third number of bits added to the number of bits in the HARQ MAC frame may equal the number of bits in the PHY codeword. The third number of bits may be padding bits or may be bits of a non-HARQ MAC frame or non-HARQ MAC frame segment, or may be bits that contain control information. Whether the third number of bits added to a HARQ MAC frame to align with a PHY codeword length is for padding, non-HARQ frames or fragments, or for control information may be indicated in a HARQ MAC frame or elsewhere within an A-MPDU.

At block 708, the device may generate an A-MPDU including the two or more HARQ MAC frames and any additional bits added to any of the HARQ MAC frames to give each HARQ MAC frame an equal number of bits as a respective PHY codeword. Any HARQ MAC frame of the A-MPDU may use the extra bits as padding bits, non-HARQ MAC frames or fragments, control information, or any combination thereof. The A-MPDU may be constructed such that a respective HARQ MAC frame may be followed by its respective added bits before a next HARQ MAC frame is included. In this manner, each combination of a HARQ MAC frame and its added bits may align with a respective PHY codeword in length.

At block 710, the device may send the A-MPDU to another device.

In one or more embodiments, to determine whether to use additional bits for padding, non-HARQ frames or fragments, or for control information may be based on the difference of block 704. When the difference is small (e.g., less than a threshold number of bits), padding bits may be used. When the difference is larger (e.g., greater than a threshold number of bits), a non-HARQ MAC frame or fragment or control information may be used. The difference in length (e.g., number of bits) used to align PHY and MAC frames for HARQ may be based on respective comparisons of the difference in bits and respective thresholds.

Figure 7B:
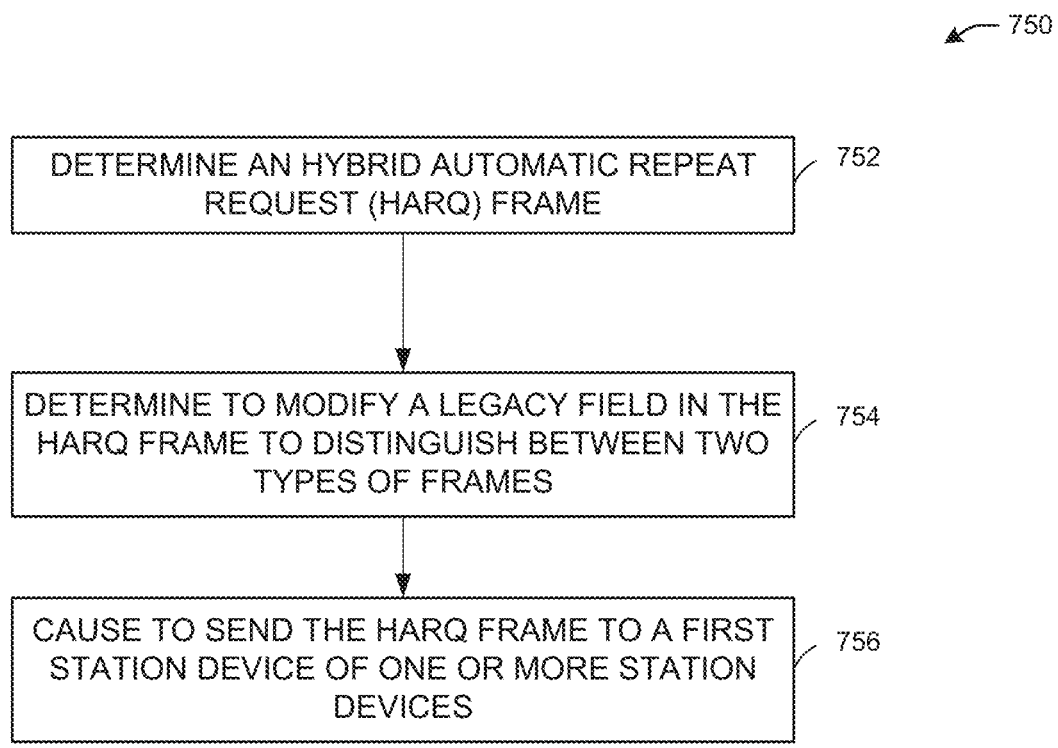
FIG. 7B illustrates a flow diagram of illustrative process for an illustrative extreme high throughput (EHT) HARQ system, in accordance with one or more example embodiments of the present disclosure.

FIG. 7B illustrates a flow diagram of illustrative process 750 for an illustrative extreme high throughput (EHT) HARQ system, in accordance with one or more example embodiments of the present disclosure.

At block 752, a device (e.g., the user device(s) 120 and/or the AP 102 of FIG. 1) may determine a HARQ frame.

At block 754, the device may determine to modify a legacy field in the HARQ frame to distinguish between two types of frames.

At block 756, the device may cause to send the HARQ frame to a first station device of one or more station devices using incremental redundancy.

In one or more embodiments, the device may use LDPC encoding to puncture once, and then puncture remaining parity bits after the first puncture. The number of parity bits that are punctured may depend on the number of HARQ retransmissions sent.

It is understood that the above descriptions are for purposes of illustration and are not meant to be limiting.

FIG. 8 shows a functional diagram of an exemplary communication station 800, in accordance with one or more example embodiments of the disclosure. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware)

capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a HARQ device 919, a network interface device/ transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 902 for generation and processing of the baseband signals and for controlling operations of the main memory 904, the storage device 916, and/or the HARQ device 919. The baseband processor may be provided on a single radio card, a single chip, or an integrated circuit (IC).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The HARQ device 919 may carry out or perform any of the operations and processes (e.g., process 700 of FIG. 7A, process 750 of FIG. 7B) described and shown above.

It is understood that the above are only a subset of what the HARQ device 919 may be configured to perform and that other functions included throughout this disclosure may also be performed by the HARQ device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 10:
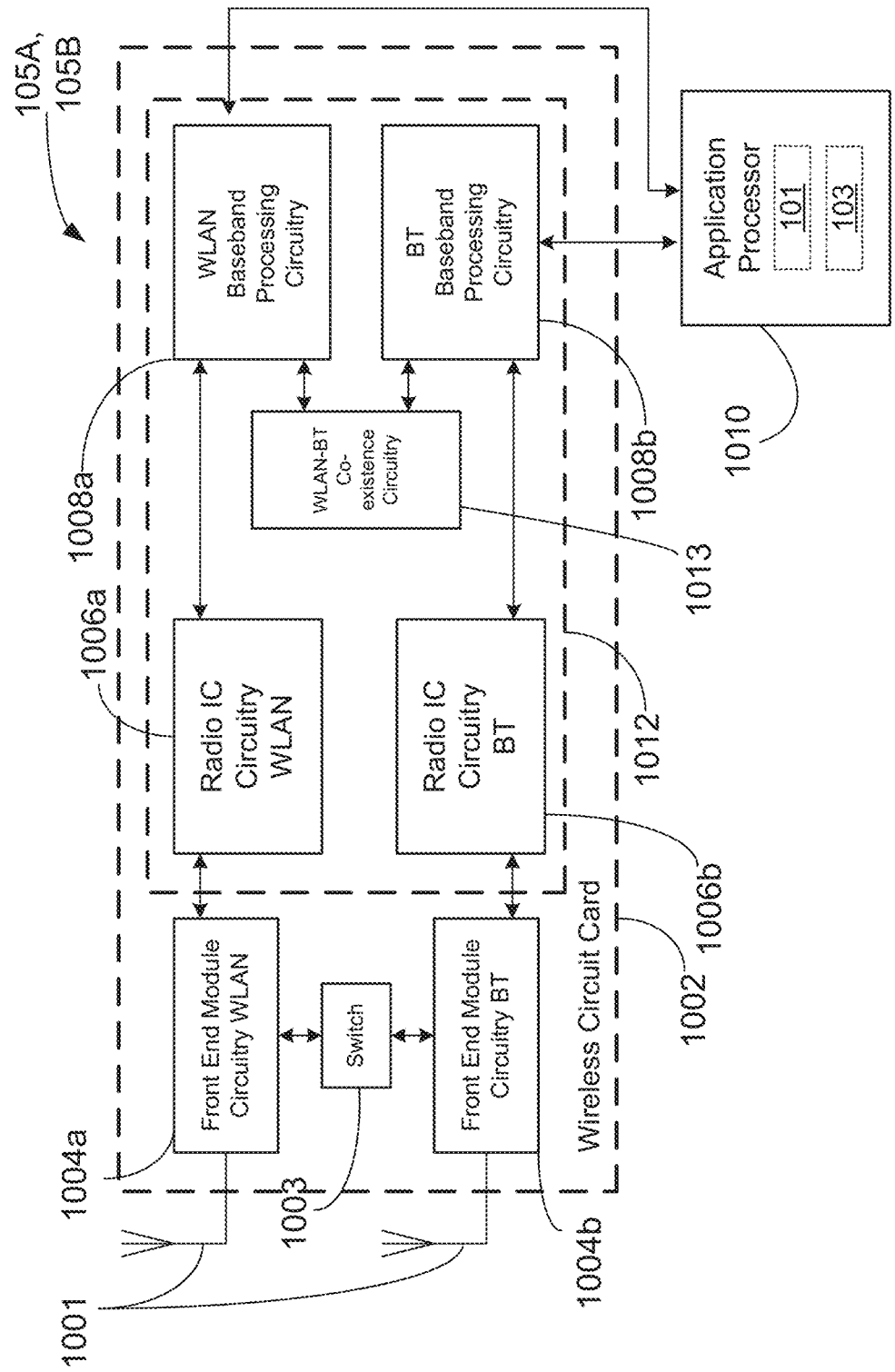
FIG. 10 is a block diagram of a radio architecture in accordance with some examples.

FIG. 10 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1004a-b, radio IC circuitry 1006a-b and baseband processing circuitry 1008a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a device for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004a-b and the radio IC circuitry 1006a-b may be provided on a single radio card. In some other embodiments, the radio IC circuitry 1006a-b and the baseband processing circuitry 1008a-b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008*b* may be compliant with a Bluetooth (BT) connectivity standard such as Bluetooth, Bluetooth 8.0 or Bluetooth 6.0, or any other iteration of the Bluetooth Standard. In In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
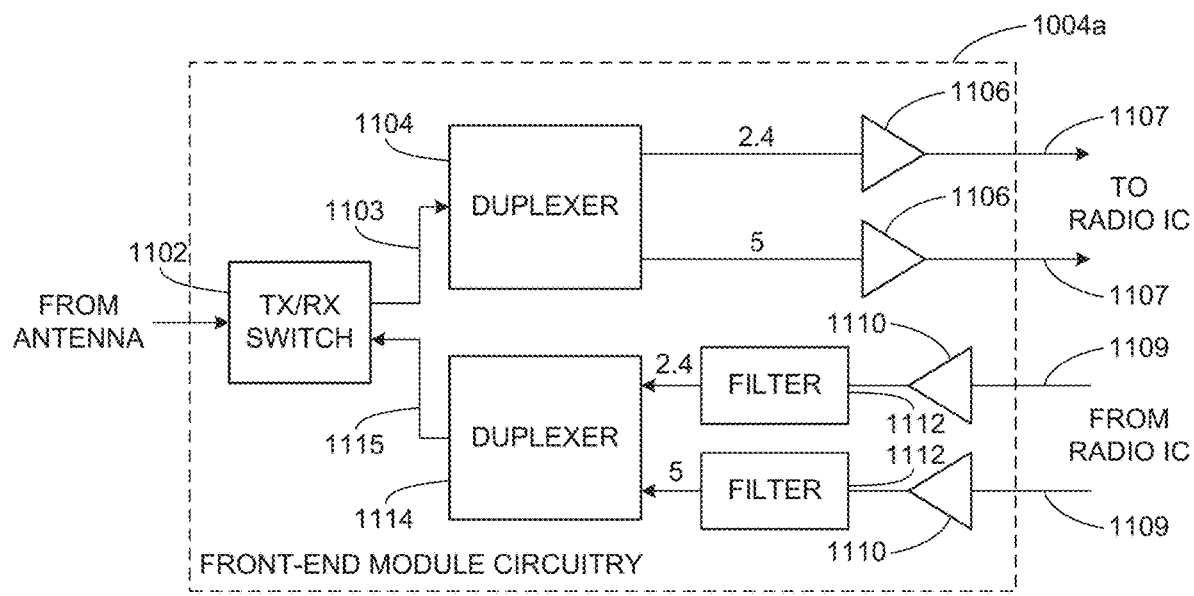
FIG. 11 illustrates an example front-end module circuitry for use in the radio architecture of FIG. 10, in accordance with one or more example embodiments of the present disclosure.

FIG. 11 illustrates WLAN FEM circuitry 1004*a* in accordance with some embodiments. Although the example of FIG. 11 is described in conjunction with the WLAN FEM circuitry 1004*a*, the example of FIG. 11 may be described in conjunction with the example BT FEM circuitry 1004*b* (FIG. 10), although other circuitry configurations may also be suitable.

In some embodiments, the FEM circuitry 1004*a* may include a TX/RX switch 1102 to switch between transmit mode and receive mode operation. The FEM circuitry 1004*a* may include a receive signal path and a transmit signal path. The receive signal path of the FEM circuitry 1004*a* may include a low-noise amplifier (LNA) 1106 to amplify received RF signals 1103 and provide the amplified received RF signals 1107 as an output (e.g., to the radio IC circuitry 1006*a-b* (FIG. 10)). The transmit signal path of the circuitry 1004*a* may include a power amplifier (PA) to amplify input RF signals 1109 (e.g., provided by the radio IC circuitry 1006*a-b*), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004*a* may be configured to operate in either the 2.4 GHz frequency spectrum or the 5 GHz frequency spectrum. In these embodiments, the receive signal path of the FEM circuitry 1004*a* may include a receive signal path duplexer 1104 to separate the signals from each spectrum as well as provide a separate LNA 1106 for each spectrum as shown. In these embodiments, the transmit signal path of the FEM circuitry 1004*a* may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004*a* as the one used for WLAN communications.

Figure 12:
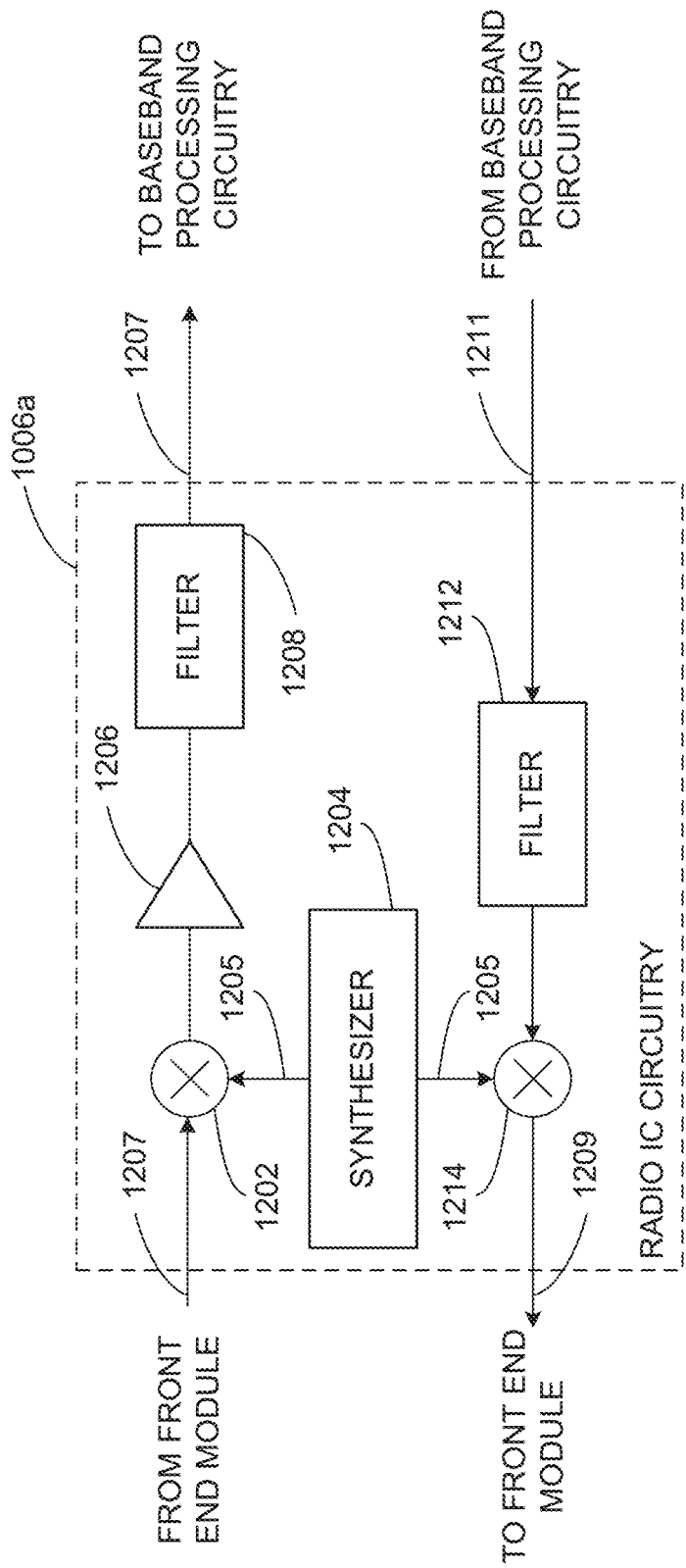
FIG. 12 illustrates an example radio IC circuitry for use in the radio architecture of FIG. 10, in accordance with one or more example embodiments of the present disclosure.

FIG. 12 illustrates radio IC circuitry 1006*a* in accordance with some embodiments. The radio IC circuitry 1006*a* is one example of circuitry that may be suitable for use as the WLAN or BT radio IC circuitry 1006*a*/1006*b* (FIG. 10), although other circuitry configurations may also be suitable. Alternatively, the example of FIG. 12 may be described in conjunction with the example BT radio IC circuitry 1006*b*.

In some embodiments, the radio IC circuitry 1006*a* may include a receive signal path and a transmit signal path. The receive signal path of the radio IC circuitry 1006*a* may include at least mixer circuitry 1202, such as, for example, down-conversion mixer circuitry, amplifier circuitry 1206 and filter circuitry 1208. The transmit signal path of the radio IC circuitry 1006*a* may include at least filter circuitry 1212 and mixer circuitry 1214, such as, for example, up-conversion mixer circuitry. Radio IC circuitry 1006*a* may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or

1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004*a*-*b* (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008*a*-*b* (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004*a*-*b*. The baseband signals 1211 may be provided by the baseband processing circuitry 1008*a*-*b* and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1204 may be provided by a voltage controlled oscillator (VCO), although that is not a requirement. A divider control input may further be provided by either the baseband processing circuitry 1008*a*-*b* (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
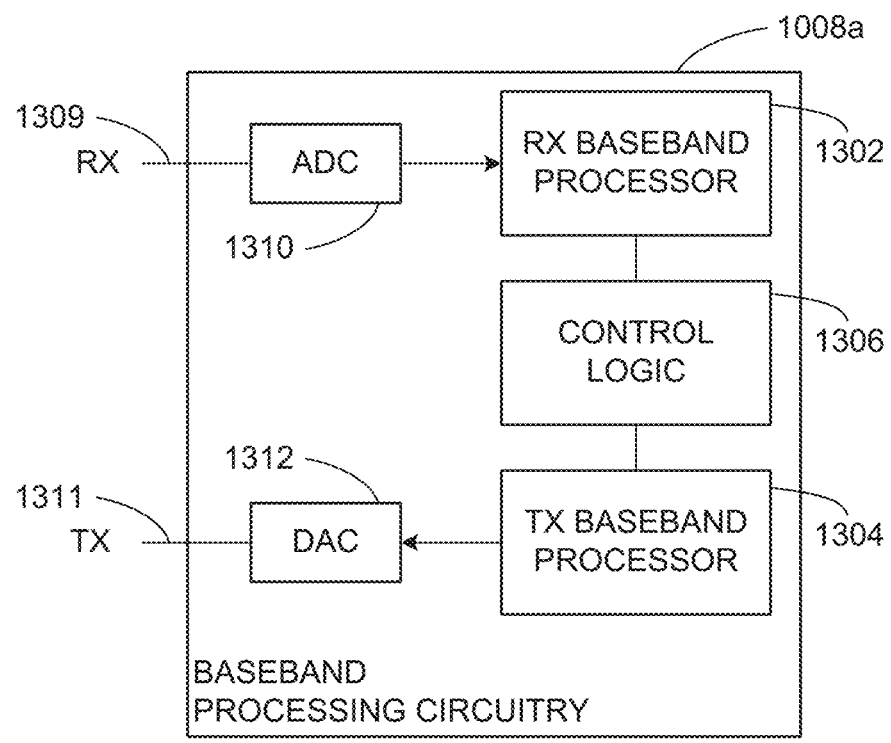
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008*a* in accordance with some embodiments. The baseband processing circuitry 1008*a* is one example of circuitry that may be suitable for use as the baseband processing circuitry 1008*a* (FIG. 10), although other circuitry configurations may also be suitable. Alternatively, the example of FIG. 12 may be used to implement the example BT baseband processing circuitry 1008*b* of FIG. 10.

The baseband processing circuitry 1008a may include a receive baseband processor (RX BBP) 1302 for processing receive baseband signals 1209 provided by the radio IC circuitry 1006a-b (FIG. 10) and a transmit baseband processor (TX BBP) 1304 for generating transmit baseband signals 1211 for the radio IC circuitry 1006a-b. The baseband processing circuitry 1008a may also include control logic 1306 for coordinating the operations of the baseband processing circuitry 1008a.

In some embodiments (e.g., when analog baseband signals are exchanged between the baseband processing circuitry 1008a-b and the radio IC circuitry 1006a-b), the baseband processing circuitry 1008a may include ADC 1310 to convert analog baseband signals 1309 received from the radio IC circuitry 1006a-b to digital baseband signals for processing by the RX BBP 1302. In these embodiments, the baseband processing circuitry 1008a may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine two or more hybrid automatic repeat request (HARQ) medium access control (MAC) frames; determine a difference between a first number of bits of a physical layer (PHY) codeword and a second number of bits of a first HARQ MAC frame of the two or more HARQ MAC frames; generate, based on the difference, a third number of bits, wherein the first number of bits is equal to a sum of the second number of bits and the third number of bits; generate an aggregated MAC frame comprising the first HARQ MAC frame, the third number of bits, and a second HARQ MAC frame of the two or more HARQ MAC frames; and cause to send the aggregated MAC frame.

Example 2 may include the device of example 1 and/or some other example herein, wherein the third number of bits are padding bits.

Example 3 may include the device of example 2 and/or some other example herein, wherein the processing circuitry is further configured to determine that the difference is less than a threshold number of bits, wherein to generate the padding bits is based at least in part on the determination that the difference is less than the threshold number of bits.

Example 4 may include the device of example 1 and/or some other example herein, wherein the third number of bits are associated with a non-HARQ MAC frame.

Example 5 may include the device of example 4 and/or some other example herein, wherein the processing circuitry is further configured to determine that the difference is greater than a threshold number of bits, wherein to generate the third number of bits associated with the non-HARQ MAC frame is based at least in part on the determination that the difference is greater than the threshold number of bits.

Example 6 may include the device of example 1 and/or some other example herein, wherein the third number of bits are associated with control information.

Example 7 may include the device of example 6 and/or some other example herein, wherein the processing circuitry is further configured to determine that the difference is greater than a threshold number of bits, wherein to generate the third number of bits associated with the control information is based at least in part on the determination that the difference is greater than the threshold number of bits Example 8 may include the device of example 1 and/or some other example herein, wherein the first HARQ MAC frame comprises an indication that the third number of bits are associated with padding bits, a non-HARQ MAC frame, or control information Example 9 may include the device of example 1 and/or some other example herein, further comprising a transceiver configured to transmit and receive wireless signals.

Example 10 may include the device of example 9 and/or some other example herein, further comprising an antenna coupled to the transceiver to cause to send the frame.

Example 11 may include a non-transitory computer-readable medium storing computer-executable instructions which when executed by one or more processors result in performing operations comprising: determining two or more hybrid automatic repeat request (HARQ) medium access control (MAC) frames; determining a difference between a first number of bits of a physical layer (PHY) codeword and a second number of bits of a first HARQ MAC frame of the two or more HARQ MAC frames; generating, based on the difference, a third number of bits, wherein the first number of bits is equal to a sum of the second number of bits and the third number of bits; generating an aggregated MAC frame comprising the first HARQ MAC frame, the third number of bits, and a second HARQ MAC frame of the two or more HARQ MAC frames; and causing to send the aggregated MAC frame.

Example 12 may include the non-transitory computer-readable medium of example 11 and/or some other example herein, wherein the third number of bits are padding bits.

Example 13 may include the non-transitory computer-readable medium of example 12 and/or some other example herein, the operations further comprising determining that the difference is less than a threshold number of bits, wherein generating the padding bits is based at least in part on the determination that the difference is less than the threshold number of bits.

Example 14 may include the non-transitory computer-readable medium of example 11 and/or some other example herein, wherein the third number of bits are associated with a non-HARQ MAC frame.

Example 15 may include the non-transitory computer-readable medium of example 14 and/or some other example herein, the operations further comprising determining that the difference is greater than a threshold number of bits, wherein generating the third number of bits associated with the non-HARQ MAC frame is based at least in part on the determination that the difference is greater than the threshold number of bits.

Example 16 may include the non-transitory computer-readable medium of example 11 and/or some other example herein, wherein the third number of bits are associated with control information.

Example 17 may include the non-transitory computer-readable medium of example 16 and/or some other example herein, the operations further comprising determining that the difference is greater than a threshold number of bits, wherein generating the third number of bits associated with the control information is based at least in part on the determination that the difference is greater than the threshold number of bits.

Example 18 may include a method comprising: determining, by processing circuitry of a device, two or more hybrid automatic repeat request (HARQ) medium access control (MAC) frames; determining a difference between a first number of bits of a physical layer (PHY) codeword and a second number of bits of a first HARQ MAC frame of the two or more HARQ MAC frames; generating, based on the difference, a third number of bits, wherein the first number of bits is equal to a sum of the second number of bits and the third number of bits; generating an aggregated MAC frame comprising the first HARQ MAC frame, the third number of bits, and a second HARQ MAC frame of the two or more HARQ MAC frames; and causing to send the aggregated MAC frame.

Example 19 may include the method of example 18 and/or some other example herein, wherein generating the aggregated MAC frame comprises generating an indication that the third number of bits are associated with padding bits, a non-HARQ MAC frame, or control information.

Example 20 may include the method of example 18 and/or some other example herein, further comprising comparing the difference to a threshold number of bits, where generating the third number of bits is based at least in part on the comparison.

Example 21 may include an apparatus comprising means for: determining two or more hybrid automatic repeat request (HARQ) medium access control (MAC) frames; determining a difference between a first number of bits of a physical layer (PHY) codeword and a second number of bits of a first HARQ MAC frame of the two or more HARQ MAC frames; generating, based on the difference, a third number of bits, wherein the first number of bits is equal to a sum of the second number of bits and the third number of bits; generating an aggregated MAC frame comprising the first HARQ MAC frame, the third number of bits, and a second HARQ MAC frame of the two or more HARQ MAC frames; and causing to send the aggregated MAC frame.

Example 23 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 24 may include an apparatus comprising logic, modules, and/or circuitry to perform one or more elements of a method described in or related to any of examples 1-22, or any other method or process described herein.

Example 25 may include a method, technique, or process as described in or related to any of examples 1-22, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 27 may include a method of communicating in a wireless network as shown and described herein.

Example 28 may include a system for providing wireless communication as shown and described herein.

Example 29 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine two or more hybrid automatic repeat request (HARQ) medium access control (MAC) frames;
   determine a difference between a first number of bits of a physical layer (PHY) codeword and a second number of bits of a first HARQ MAC frame of the two or more HARQ MAC frames;
   generate, based on a comparison of the difference to a threshold number of bits greater than zero bits, a third number of bits, wherein the first number of bits is equal to a sum of the second number of bits and the third number of bits;
   generate an aggregated MAC frame comprising the first HARQ MAC frame, the third number of bits, and a second HARQ MAC frame of the two or more HARQ MAC frames; and
   cause to send the aggregated MAC frame.

2. The device of claim 1, wherein the third number of bits are padding bits.

3. The device of claim 2, wherein the processing circuitry is further configured to determine that the difference is less than the threshold number of bits, wherein to generate the padding bits is based at least in part on the determination that the difference is less than the threshold number of bits.

4. The device of claim 1, wherein the third number of bits are associated with a non-HARQ MAC frame.

5. The device of claim 4, wherein the processing circuitry is further configured to determine that the difference is greater than the threshold number of bits, wherein to generate the third number of bits associated with the non-HARQ MAC frame is based at least in part on the determination that the difference is greater than the threshold number of bits.

6. The device of claim 1, wherein the third number of bits are associated with control information.

7. The device of claim 6, wherein the processing circuitry is further configured to determine that the difference is greater than the threshold number of bits, wherein to generate the third number of bits associated with the control information is based at least in part on the determination that the difference is greater than the threshold number of bits.

8. The device of claim 1, wherein the first HARQ MAC frame comprises an indication that the third number of bits are associated with padding bits, a non-HARQ MAC frame, or control information.

9. The device of claim 1, further comprising a transceiver configured to transmit and receive wireless signals, the wireless signals comprising the aggregated MAC frame.

10. The device of claim 9, further comprising an antenna coupled to the transceiver to cause to send the frame.

11. A non-transitory computer-readable medium storing computer-executable instructions which when executed by one or more processors result in performing operations comprising:
    determining two or more hybrid automatic repeat request (HARQ) medium access control (MAC) frames;
    determining a difference between a first number of bits of a physical layer (PHY) codeword and a second number of bits of a first HARQ MAC frame of the two or more HARQ MAC frames;
    generating, based on a comparison of the difference to a threshold number of bits greater than zero bits, a third number of bits, wherein the first number of bits is equal to a sum of the second number of bits and the third number of bits;
    generating an aggregated MAC frame comprising the first HARQ MAC frame, the third number of bits, and a second HARQ MAC frame of the two or more HARQ MAC frames; and
    causing to send the aggregated MAC frame.

12. The non-transitory computer-readable medium of claim 11, wherein the third number of bits are padding bits.

13. The non-transitory computer-readable medium of claim 12, the operations further comprising determining that the difference is less than the threshold number of bits, wherein generating the padding bits is based at least in part on the determination that the difference is less than the threshold number of bits.

14. The non-transitory computer-readable medium of claim 11, wherein the third number of bits are associated with a non-HARQ MAC frame.

15. The non-transitory computer-readable medium of claim 14, the operations further comprising determining that the difference is greater than the threshold number of bits, wherein generating the third number of bits associated with the non-HARQ MAC frame is based at least in part on the determination that the difference is greater than the threshold number of bits.

16. The non-transitory computer-readable medium of claim 11, wherein the third number of bits are associated with control information.

17. The non-transitory computer-readable medium of claim 16, the operations further comprising determining that the difference is greater than the threshold number of bits, wherein generating the third number of bits associated with the control information is based at least in part on the determination that the difference is greater than the threshold number of bits.

18. A method comprising:
- determining, by processing circuitry of a device, two or more hybrid automatic repeat request (HARQ) medium access control (MAC) frames;
- determining a difference between a first number of bits of a physical layer (PHY) codeword and a second number of bits of a first HARQ MAC frame of the two or more HARQ MAC frames;
- generating, based on a comparison of the difference to a threshold number of bits greater than zero bits, a third number of bits, wherein the first number of bits is equal to a sum of the second number of bits and the third number of bits;
- generating an aggregated MAC frame comprising the first HARQ MAC frame, the third number of bits, and a second HARQ MAC frame of the two or more HARQ MAC frames; and
- causing to send the aggregated MAC frame.

19. The method of claim 18, wherein generating the aggregated MAC frame comprises generating an indication that the third number of bits are associated with padding bits, a non-HARQ MAC frame, or control information.

20. The method of claim 18, further comprising comparing the difference to a threshold number of bits, where generating the third number of bits is based at least in part on the comparison.

* * * * *